US010757940B2

(12) United States Patent
Ferguson

(10) Patent No.: US 10,757,940 B2
(45) Date of Patent: Sep. 1, 2020

(54) LOW TOXICITY, LOW ODOR, LOW VOLATILITY SOLVENT FOR AGRICULTURAL CHEMICAL FORMULATIONS

(75) Inventor: Dave C. Ferguson, Spring, TX (US)

(73) Assignee: INDORAMA VENTURES OXIDES LLC, The Woodlands, TX (US)

( * ) Notice: Subject to any disclaimer, the term of this patent is extended or adjusted under 35 U.S.C. 154(b) by 106 days.

(21) Appl. No.: 13/989,115

(22) PCT Filed: Nov. 29, 2011

(86) PCT No.: PCT/US2011/062338

§ 371 (c)(1),
(2), (4) Date: May 23, 2013

(87) PCT Pub. No.: WO2012/074975

PCT Pub. Date: Jun. 7, 2012

(65) Prior Publication Data

US 2013/0237423 A1 Sep. 12, 2013

Related U.S. Application Data

(60) Provisional application No. 61/419,314, filed on Dec. 3, 2010.

(51) Int. Cl.

| | |
|---|---|
| ***A01N 43/80*** | (2006.01) |
| ***A01N 33/18*** | (2006.01) |
| ***A01N 25/02*** | (2006.01) |
| ***A01N 37/22*** | (2006.01) |
| ***A01N 37/34*** | (2006.01) |
| ***A01N 43/653*** | (2006.01) |

(52) U.S. Cl.

CPC ............. *A01N 43/80* (2013.01); *A01N 25/02* (2013.01); *A01N 33/18* (2013.01); *A01N 37/22* (2013.01); *A01N 37/34* (2013.01); *A01N 43/653* (2013.01)

(58) Field of Classification Search

CPC ........ A01N 37/22; A01N 25/02; A01N 33/18; A01N 43/653; A01N 43/80; A01N 37/34; A01N 53/00

USPC ......... 504/271, 334, 347; 514/383, 514, 515

See application file for complete search history.

(56) References Cited

U.S. PATENT DOCUMENTS

| | | | | |
|---|---|---|---|---|
| 4,886,656 | A | 12/1989 | Obayashi et al. | |
| 6,635,663 | B1 | 10/2003 | Zen | |
| 2003/0069135 | A1 | 4/2003 | Kober et al. | |
| 2004/0063583 | A1* | 4/2004 | Zen | A01N 25/02 504/254 |
| 2007/0244011 | A1* | 10/2007 | Gioia | A01N 33/18 504/347 |
| 2009/0082206 | A1 | 3/2009 | Ikeuchi et al. | |
| 2009/0105073 | A1* | 4/2009 | Taranta et al. | 504/100 |
| 2010/0234227 | A1* | 9/2010 | Maier | A01N 25/02 504/138 |

FOREIGN PATENT DOCUMENTS

| | | | |
|---|---|---|---|
| EP | 1 210 877 | A1 | 6/2002 |
| EP | 1210877 | A1 * | 6/2002 |
| WO | 2007/110355 | A | 10/2007 |

OTHER PUBLICATIONS

The definition of "include", Merriam-Webster [online]. [retrieved on Jun. 6, 2017]. Retrieved from: http://www.merriam-webster.com/dictionary/include.*

Communication Pursuant to Rule 114(2) EPC for Application No. 11844153.4-1454 dated Aug. 30, 2013.

* cited by examiner

*Primary Examiner* — Johann R Richter
*Assistant Examiner* — Courtney A Brown

(57) ABSTRACT

An agricultural chemical composition comprises a solvent having the general formula $CO(OR_a)(R_b)$, wherein $R_a$ is a linear or branched alkyl group of one to eight carbon atoms and $R_b$ is an aromatic group. Active agricultural components are dissolved in the solvent to produce a solution usable for distributing the active components.

12 Claims, No Drawings

LOW TOXICITY, LOW ODOR, LOW VOLATILITY SOLVENT FOR AGRICULTURAL CHEMICAL FORMULATIONS

CROSS-REFERENCE TO RELATED APPLICATIONS

This application is the National Phase of International Application PCT/US2011/062338 filed Nov. 29, 2011 which designated the U.S. and which claims priority to U.S. Application Ser. No. 61/419,314 filed Dec. 3, 2010. The noted applications are incorporated herein by reference.

FIELD

Embodiments of the present invention generally relate to agricultural chemical formulations and processes of making them. More specifically, embodiments described herein relate to formulations having superior odor, toxicity, and water solubility properties.

BACKGROUND

Agricultural chemicals are usually distributed in mixtures or blends that may include solvents, promoters, adjuvants, surfactants, emulsifiers, and the like. Many are distributed in liquid emulsifiable concentrates which are blended with water at the treatment site to produce an emulsion that is distributed over crops. The emulsion provides a vehicle for the chemical phase to contact plant surfaces to deliver the agricultural chemical efficiently. Other formulation types include water-based emulsions, suspoemulsions, and micro-emulsifiable concentrates.

It is generally desired that the chemical formulation contact and cover plant surfaces efficiently and be relatively resistant to water dissolution, such that the chemicals remain in effective contact with the plants and do not merge with ground water. It is also desired that any chemicals that do merge with ground water have low water toxicity.

The use of solvents in the preparation of agricultural chemical formulations is well known. Agricultural active components are often solids or oily liquids that must be brought into aqueous suspension for final use. These active components are typically first dissolved in a water immiscible solvent. Organic solvents have been used in various formulation types since the 1950's when pesticide products were first developed and used on a large scale. Commonly used solvents include alkyl benzenes, methyl esters of fatty acids, aliphatic and cycloaliphatic hydrocarbons, and fuel oils, all of which have low water solubility but relatively low solvating power. The organic solvents often have significant toxicity, and may be flammable.

Solvents showing reduced toxicity and/or flammability that have been used include dibasic esters, usually methyl esters, of $C_8$-$C_{16}$ dicarboxylic acids, fatty acid amide solvents such as dimethylamide and morpholineamide derivatives of $C_6$-$C_{16}$ fatty acids, and mono-alkylene carbonates such as ethylene carbonate, propylene carbonate and butylene carbonate. These solvents have limited solvating power with respect to the active components, however, are expensive to purify, and some have substantial solubility in water.

Other solvents include isophorone, MEK, n-methylpyrolidone, butyl lactate, DMSO, and acetophenone, all of which are good solvents but also have undesirable water solubility. There is a continuing need for agricultural chemical formulations using solvents with low odor, toxicity, and water solubility, but good solvating power with respect to agricultural chemicals.

SUMMARY

Embodiments described herein provide an agricultural chemical formulation with between about 5% and about 70% by weight of an agricultural chemical portion containing one or more compounds of a type selected from the group consisting of pyrethroids, mitose inhibitors, protoporphyrinogen-IX oxidase inhibitors, bleacher herbicides, triazoles, METI compounds, photosynthesis inhibitors, insecticides, nicotinic receptor agonist/antagonist compounds, fungicides, strobilurins, carboxanilides, ALS inhibitors, plant growth regulators, molluscides, nematocides, acaricides, and combinations thereof, and between about 30% and about 80% of an ester portion comprising one or more compounds having the general formula $CO(OR_a)(R_b)$, wherein $R_a$ is a linear or branched alkyl group of one to eight carbon atoms and $R_b$ is an aromatic group.

Other embodiments provide a chemical mixture having between about 5% and about 70% by weight of an agricultural chemical portion containing one or more compounds of a type selected from the group consisting of pyrethroids, mitose inhibitors, protoporphyrinogen-IX oxidase inhibitors, bleacher herbicides, triazoles, METI compounds, photosynthesis inhibitors, insecticides, nicotinic receptor agonist/antagonist compounds, fungicides, strobilurins, carboxanilides, ALS inhibitors, plant growth regulators, molluscides, nematocides, acaricides, and combinations thereof and between about 35% and about 80% butyl benzoate.

Other embodiments provide a process of making an agricultural chemical formulation by dissolving an active agricultural component comprising one or more compounds from the group consisting of pyrethroids, mitose inhibitors, protoporphyrinogen-IX oxidase inhibitors, bleacher herbicides, triazoles, METI compounds, photosynthesis inhibitors, insecticides, nicotinic receptor agonist/antagonist compounds, fungicides, strobilurins, carboxanilides, ALS inhibitors, plant growth regulators, molluscides, nematocides, acaricides, and combinations thereof in a solvent mixture comprising one or more compounds having the general formula $CO(OR_a)(R_b)$, wherein $R_a$ is a linear or branched alkyl group of one to eight carbon atoms and $R_b$ is an aromatic group, wherein a mass ratio of the active agricultural component to the solvent mixture is between about 0.25:1 and about 20:1

DETAILED DESCRIPTION

Surprisingly, agricultural chemicals may be readily dispersed in certain types of organic solvents to form an effective delivery fluid that has low toxicity, flammability, and odor. An agricultural chemical formulation may be made by dissolving one or more active components in an ester comprising one or more compounds having the general formula $CO(OR_a)(R_b)$, wherein $R_a$ is a linear or branched alkyl group of one to eight carbon atoms and $R_b$ is an aromatic group. In one aspect, $R_a$ may be selected from the group consisting of methyl, ethyl, propyl, butyl, pentyl, hexyl, heptyl, octyl, and derivatives thereof. In another aspect, $R_b$ may comprise a benzene ring. $R_b$ may be selected from the group consisting of benzyl, xylyl (i.e. dimethyl benzyl), toluyl (i.e. methyl benzyl), ethyl benzyl, and derivatives thereof. In one embodiment, $R_a$ may be a butyl group.

In another embodiment, $R_b$ may be a benzyl group. One example of a suitable solvent that yields favorable properties in an agricultural blend is butyl benzoate. Other suitable compounds include, but are not limited to, methyl benzoate, ethyl benzoate, propyl benzoate, methyl toluate, ethyl toluate, propyl toluate, butyl toluate, methyl xylate, ethyl xylate, propyl xylate, butyl xylate, methyl ethylbenzoate, ethyl ethylbenzoate, propyl ethylbenzoate, and butyl ethylbenzoate.

The active component generally comprises between about 5% and about 75% by weight of the blend, such as between about 10% and about 50%, for example between about 20% and about 40%. The ester typically comprises between about 30% and about 80% of the blend, such as between about 40% and about 65%, for example between about 45% and about 55%. Mixtures of esters may be used as well.

Active components usable with the materials described above include various pesticides, herbicides, and adjuvants. Active components may be compounds of a type selected from the group consisting of pyrethroids, mitose inhibitors, protoporphyrinogen-IX oxidase inhibitors, bleacher herbicides, triazoles, METI compounds, photosynthesis inhibitors, insecticides, nicotinic receptor agonist/antagonist compounds, fungicides such as organochlorine compounds, strobilurins, carboxanilides, ALS inhibitors such as sulfonyl ureas, plant growth regulators, molluscides, nematocides, acaricides, and combinations thereof. Examples of such compounds include, but are not limited to, ametryn, triadimenol, imidacloprid, epoxiconazole, chlorothalonil, diflufenican, cypermethrin, fluoxastrobin, boscalid, nicosulfuron, metsulfuron, trifluralin, bifenthrin, myclobutanil, pendimethalin, deltamethrin, tolfenpyrad, pyridaben, tebuconazole, metolachlor, carfentrazone, clomazone, propanil, and derivates thereof. Compatible mixtures of such active components may be used in multifunctional formulations comprising solvents described herein. For example, multiple pesticides may be used in a single formulation to remove multiple classes of malefactors, pesticides may be blended with fertilizers and/or herbicides or other compatible active ingredients to improve the efficiency of crop management.

Formulations described herein provide good deliverability of active components in emulsions or dispersions while exhibiting low toxicity, low bio-accumulation, good biodegradability and high flash points. The solvents described above also slow crystallization of active components when dispersed in water emulsions, avoiding decay in concentration of the active component in the emulsion. Also, the solvents described above generally do not degrade materials found in equipment used for spreading the emulsions or dispersions.

Other components present in the formulations described above may be surfactants, emulsifiers, stabilizers, anti-oxidants, corrosion inhibitors, activators, wetting agents, dyes, adjuvants, humectants, and the like. Such compounds may provide between about 3% and about 50% by weight, such as between about 3% and about 20% by weight, of the formulation.

Examples of emulsifiers include, but are not limited to, anionic and cationic surfactants. Anionic surfactants may include calcium salts, amine salts, or sulfonates of $C_{10}$-$C_{16}$ alkylbenzenes, alkylether sulfates, alkylphenoletherphosphates and ester phosphates, nonionic surfactants such as alkoxylated alcohols and alkylphenols, ethoxylated fatty acids, ethoxylated vegetable oils such as ethoxylated castor oil, fatty acid esters, for example esters of sorbitol, and their ethoxylated derivatives, ethoxylated amines, and condensates of glycerol. Cationic surfactants may include cationic amines, optionally combined with alkylsulfonates, ether sulfonates, or ether phosphates. Surfactants usable in emulsifier blends also include, but are not limited to, anionic calcium and/or amine neutralization linear alkylsulfonates surfactants, such as NANSA® EVM 70/2E or NANSA YS94, phosphate esters of nonionic surfactants such as SURFONIC® PE-1198 or TERSPERSE® 2202, cationic tallow amine surfactants such as SURFONIC T-15, nonionic surfactants such as SURFONIC L24-7 or ECOTERIC® T85, blends of anionic and nonionic surfactants such as TERMUL® 3640, each of which is available from Huntsman Performance Products of The Woodlands, Tex.

Co-solvents usable in formulations described herein include dimethylsulfoxide (DMSO), cyclohexanone, short chain alcohols such as 2-ethylhexanol and n-butanol, n-alkylpyrrolidones, fatty acid dimethyl esters, fatty acid esters, dibasic esters, aromatic hydrocarbons and/or aliphatic hydrocarbons, which may be paraffinic, olefinic, or diolefinic, dimethylamides such as $C_8$-dimethylamide, $C_{10}$-dimethylamide, and $C_{12}$-dimethylamide, glycols such as ethylene glycol, propylene glycol, or polyalkylene glycols, triols, other esters, ketones, ethers, amides, carboxylic acids, aldehydes, epoxides, estermides, acyl halides, acid anhydrides, nitriles, nitros, thiols, sulfides, and combinations thereof. Examples of aromatic hydrocarbons are the SOLVESSO® solvents available from ExxonMobil Chemical Co., of Houston, Tex. Examples of paraffinic hydrocarbons are the EXXSOL® solvents of ExxonMobil Chemical Co. Cyclic hydrocarbons such as cyclohexanone and isophorone, and ester solvents such as methyloleate and EXXATE® solvents of ExxonMobil Chemical Co. or the PURASOLV® lactate esters available from Purac Biochem B.V. Corp. of Gorinchem, The Netherlands.

Table 1 lists formulations of exemplary agricultural mixtures having the advantages described herein.

TABLE 1

Exemplary Agricultural Chemical Formulations Using Ester Solvents

| | Blends, wt % | | | | | | | | | | |
|---|---|---|---|---|---|---|---|---|---|---|---|
| Ingredients | 1 | 2 | 3 | 4 | 5 | 6 | 7 | 8 | 9 | 10 | 11 |
| Trifluralin, technical (mitose inhibitor) | | | 60 | | | | | | | | |
| Deltamethrin, technical (pyrethroid) | 9 | 5 | | | | | | | | | |
| Bifenthrin, technical (pyrethroid) | | 5 | | 20 | | | | | | | |
| Tebuconazole, technical (azole) | | | | | 20 | | | | | 25 | |
| Myclobutanil, technical (azole) | | | | | | 15 | | | | | |
| Metolachlor, technical (VLCFA inhibitor) | | | | | | | 50 | | | | |
| Clomazone, technical (bleacher herbicide) | | | | | | | | 45 | | | |
| Propanil, technical (photosynthesis inhibitor) | | | | | | | | | 25 | | |

TABLE 1-continued

Exemplary Agricultural Chemical Formulations Using Ester Solvents

| Ingredients | Blends, wt % | | | | | | | | | | |
|---|---|---|---|---|---|---|---|---|---|---|---|
| | 1 | 2 | 3 | 4 | 5 | 6 | 7 | 8 | 9 | 10 | 11 |
| Cypermethrin (pyrethroid) | | | | | | | | | | | 40 |
| Butyl benzoate (solvent) | 81 | 40 | 30 | 68 | 70 | 75 | 42 | 45 | 60 | 36 | 50 |
| N-methylpyrolidone | | | | | | | | | | 20 | |
| Propylene glycol (humectant) | | | | | | | | | | 4 | |
| Water | | | | | | | | | | 5 | |
| Emulsifier Blend | 10 | 50 | 10 | 12 | 10 | 10 | 8 | 10 | 15 | 10 | 10 |

The emulsifier blend used in each of the formulations above may include the additives and surfactants listed above.

The agricultural formulations described herein are generally used by adding 5 to 5,000 liters of water per liter of formulation. The formulations described herein may be emulsifiable concentrate (EC) formulations that, when blended with water form an emulsion in water (EW) formulation, a microemulsion (ME) formulation, or may be a dispersion concentrate (DC) formulation. An ME formulation is an emulsion in which droplets of the EC formulation dispersed in the water are so small as to be effectively invisible. An ME formulation may be made using a microemulsion concentrate (MEC), which is an EC that, when mixed with water, will form an ME. A DC formulation features the active components dispersed in a liquid phase in such an amount that, when combined with water, the amount of active components in the resulting applicable liquid exceeds the soluble level of the active components in water, so that at least a portion of the active components remain solid. A DC generally features a solid suspended in an oil or water phase. A suspoemulsion (SE) may be made by mixing an EC and a DC and optionally adding further liquid such as oil or water.

While the foregoing is directed to embodiments of the present invention, other and further embodiments of the invention may be devised without departing from the basic scope thereof, and the scope thereof is determined by the claims that follow.

The invention claimed is:

1. An agricultural chemical formulation consisting of a blend of:

between about 5% and about 70% by weight of ametryn, triadimenol, imidacloprid, epoxiconazole, chlorothalonil, diflufenican, cypermethrin, fluoxastrobin, boscalid, nicosulfuron, metsulfuron, trifluralin, bifenthrin, myclobutanil, pendimethalin, deltamethrin, tolfenpyrad, pyridaben, tebuconazole, metolachlor, carfentrazone, clomazone, propanil or a mixture thereof dissolved in one or more ester compounds having the general formula $CO(OR_a)(R_b)$, wherein $R_a$ is a linear or branched alkyl group of one to eight carbon atoms and $R_b$ is an aromatic group and optionally between about 3% by weight to about 50% by weight of an emulsifier selected from a cationic surfactant, a mixture of the cationic surfactant and an anionic surfactant and a mixture of a the cationic surfactant, the anionic surfactant and a nonionic surfactant, stabilizer, anti-oxidant, corrosion inhibitor, activator, wetting agent, dye humectant, a co-solvent selected from dimethylsulfoxide, cyclohexanone, an n-alkylpyrrolidone, a fatty acid dimethyl ester, a fatty acid ester, a dibasic ester, an aromatic hydrocarbon, an aliphatic hydrocarbon, a dimethylamide, a ketone, an ether, an amide, a carboxylic acid, an aldehyde, an epoxide, an estermide, an acyl halide, an acid anhydride, a nitrile, a nitro, a thiol and a sulfide or a combination thereof, where the % by weight is based on the total weight of the blend.

2. The agricultural chemical formulation of claim 1, wherein $R_b$ comprises a benzene ring.

3. The agricultural chemical formulation of claim 1, wherein $R_a$ is selected from the group consisting of methyl, ethyl, propyl, butyl, pentyl, hexyl, heptyl and, octyl.

4. The agricultural chemical formulation of claim 1, wherein $R_b$ is selected from the group consisting of benzyl, xylyl and, toluyl.

5. The agricultural chemical formulation of claim 1, wherein an emulsifier is present in the blend.

6. The agricultural chemical formulation of claim 5 wherein the ester is butyl benzoate.

7. The agricultural chemical formulation of claim 1, wherein two or more ester compounds having the general formula $CO(OR_a)(R_b)$, wherein $R_a$ is a linear or branched alkyl group of one to eight carbon atoms and $R_b$ is an aromatic group are present in the blend.

8. The agricultural chemical formulation of claim 5, wherein the co-solvent is present in the blend.

9. The agricultural chemical formulation of claim 8, wherein the co-solvent is a hydrocarbon.

10. A chemical composition consisting of a blend of between about 5% and about 70% by weight of ametryn, triadimenol, imidacloprid, epoxiconazole, chlorothalonil, diflufenican, cypermethrin, fluoxastrobin, boscalid, nicosulfuron, metsulfuron, trifluralin, bifenthrin, myclobutanil, pendimethalin, deltamethrin, tolfenpyrad, pyridaben, tebuconazole, metolachlor, carfentrazone, clomazone, propanil or a mixture thereof dissolved in butyl benzoate and optionally between about 3% by weight and about 50% by weight of a co-solvent selected from dimethylsulfoxide, cyclohexanone, an n-alkylpyrrolidone, a fatty acid dimethyl ester, a fatty acid ester, a dibasic ester, an aromatic hydrocarbon, an aliphatic hydrocarbon, a dimethylamide, a ketone, an ether, an amide, a carboxylic acid, an aldehyde, an epoxide, an estermide, an acyl halide, an acid anhydride, a nitrile, a nitro, a thiol, a sulfide, and a mixture thereof, where the % by weight is based on the total weight of the blend.

11. A process of making an agricultural chemical formulation according to claim 1, comprising:

dissolving ametryn, triadimenol, imidacloprid, epoxiconazole, chlorothalonil, diflufenican, cypermethrin, fluoxastrobin, boscalid, nicosulfuron, metsulfuron, trifluralin, bifenthrin, myclobutanil, pendimethalin, deltamethrin, tolfenpyrad, pyridaben, tebuconazole, metolachlor, carfentrazone, clomazone, propanil or a mixture thereof in one or more ester compounds having the general formula $CO(OR_a)(R_b)$, wherein $R_a$ is a linear or branched alkyl group of one to eight carbon atoms and $R_b$ is an aromatic group wherein a mass ratio of the agricultural compound to the one or more ester compounds is between about 0.25:1 and about 20:1.

12. The agricultural chemical formulation according to claim 1, wherein between about 60% and about 70% by weight of ametryn, triadimenol, imidacloprid, epoxiconazole, chlorothalonil, diflufenican, cypermethrin, fluoxastrobin, boscalid, nicosulfuron, metsulfuron, trifluralin, bifenthrin, myclobutanil, pendimethalin, deltamethrin, tolfenpyrad, pyridaben, tebuconazole, metolachlor, carfentrazone, clomazone, propanil or a mixture thereof is dissolved in the one or more ester compounds having the general formula $CO(OR_a)(R_b)$, wherein $R_a$ is a linear or branched alkyl group of one to eight carbon atoms and $R_b$ is an aromatic group.

* * * * *